United States Patent
Jeong et al.

(10) Patent No.: US 9,578,396 B2
(45) Date of Patent: Feb. 21, 2017

(54) METHOD AND DEVICE FOR PROVIDING HTML-BASED PROGRAM GUIDE SERVICE IN A BROADCASTING TERMINAL, AND RECORDING MEDIUM THEREFOR

(71) Applicant: Alticast Corporation, Seoul (KR)

(72) Inventors: Youn Seok Jeong, Gyeonggi-Do (KR); Jin Won Lee, Seoul (KR); Sang Yong Kim, Seoul (KR)

(73) Assignee: Alticast Corporation, Seoul (KR)

( * ) Notice: Subject to any disclaimer, the term of this patent is extended or adjusted under 35 U.S.C. 154(b) by 0 days.

(21) Appl. No.: 14/668,391

(22) Filed: Mar. 25, 2015

(65) Prior Publication Data

US 2015/0201251 A1 Jul. 16, 2015

Related U.S. Application Data

(63) Continuation of application No. PCT/KR2013/007918, filed on Sep. 3, 2013.

(30) Foreign Application Priority Data

Sep. 25, 2012 (KR) .................. 10-2012-0106500

(51) Int. Cl.
  *H04N 21/8543* (2011.01)
  *H04N 21/482* (2011.01)
  (Continued)

(52) U.S. Cl.
  CPC ........ *H04N 21/8543* (2013.01); *H04N 21/235* (2013.01); *H04N 21/2393* (2013.01);
  (Continued)

(58) Field of Classification Search
  CPC .............. H04N 21/8543; H04N 21/482; H04N 21/4438; H04N 21/4221; H04N 21/2393; H04N 21/42212; H04N 21/4312; H04N 21/4821; H04N 21/235; H04N 21/472
  (Continued)

(56) References Cited

U.S. PATENT DOCUMENTS 6,182,094 B1 * 1/2001 Humpleman ....... H04L 12/2805
  348/E5.006
6,675,385 B1 * 1/2004 Wang ................. H04N 5/44543
  348/E5.002

(Continued)

FOREIGN PATENT DOCUMENTS

JP  2003-515983 A  5/2003
JP  2004-364086 A  12/2004

(Continued)

*Primary Examiner* — Hoang-Vu A Nguyen-Ba
(74) *Attorney, Agent, or Firm* — Mintz Levin Cohn Ferris Glovsky & Popeo, P.C.; Kongsik Kim; Jonathon Western

(57) ABSTRACT

Disclosed are a method and a device for providing a hypertext markup language (HTML)-based program guide service, and a recording medium therefor. The method for providing a hypertext markup language (HTML)-based program guide service in a broadcast providing device, according to the present invention, comprises the steps of: outputting a start page according to a program guide service start request of a user, wherein a container included in a resource for the start page generates a first key handler for processing a key event of the user; and outputting one or more menu pages for menu navigation according to a request of the user, wherein the start page and each of the one or more menu pages have different resource addresses, and a life cycle of the one or more menu pages is managed by the first key handler.

8 Claims, 7 Drawing Sheets

(51) Int. Cl.
  *H04N 21/443* (2011.01)
  *H04N 21/422* (2011.01)
  *H04N 21/239* (2011.01)
  *H04N 21/431* (2011.01)
  *H04N 21/235* (2011.01)
  *H04N 21/472* (2011.01)

(52) U.S. Cl.
  CPC ... *H04N 21/4221* (2013.01); *H04N 21/42212* (2013.01); *H04N 21/4312* (2013.01); *H04N 21/4438* (2013.01); *H04N 21/472* (2013.01); *H04N 21/482* (2013.01); *H04N 21/4821* (2013.01)

(58) Field of Classification Search
  USPC ............... 725/44, 51, 53, 61, 109, 112, 120; 715/234, 251, 253, 708, 817, 825
  See application file for complete search history.

(56) References Cited

U.S. PATENT DOCUMENTS

| | | | |
|---|---|---|---|
| 7,103,834 B1 * | 9/2006 | Humpleman | H04L 12/2803 348/E5.006 |
| 2005/0044568 A1 | 2/2005 | White et al. | |
| 2015/0264447 A1 * | 9/2015 | Brooks | H04N 21/222 725/31 |

FOREIGN PATENT DOCUMENTS

| KR | 10-2004-0066615 A | 7/2004 |
|---|---|---|
| KR | 10-2010-0127240 A | 12/2010 |

* cited by examiner

METHOD AND DEVICE FOR PROVIDING HTML-BASED PROGRAM GUIDE SERVICE IN A BROADCASTING TERMINAL, AND RECORDING MEDIUM THEREFOR

CROSS-REFERENCE TO RELATED APPLICATIONS

This application is a continuation of International application No. PCT/KR2013/007918 filed on Sep. 3, 2013, which claims priority to Korean Application No. 10-2012-0106500 filed on Sep. 25, 2012. The applications are incorporated herein by reference.

TECHNICAL FIELD

The present invention relates to a method and an apparatus for providing a program guide service based on HTML and a recorded medium therefor, more particularly relates to a method and an apparatus for providing a guide service related to a broadcasting in the unit of an HTML page and a recorded medium therefor.

DESCRIPTION OF RELATED ART

In the past, the TV set provided unidirectional services only.

It is now possible to compress broadcast signals, which may include video, audio and data, into digital signals according as digital broadcasting service is provided in recent, and thus the possibility of providing multiple channels is opened. Moreover, increases in network processing capacity have also made it possible to provide bidirectional broadcast services.

Based on improvements in the performance of the set-top box or TV set as well as increases in network bandwidth, various types of services are being provided.

That is, including not only live programs, which have been provided in the past, but also various on-demand programs requested by the user. Of course, the various services currently being provided also include games, shopping, etc., in addition to real-time or on-demand programming.

Various services are being provided through the set-top box or the TV as mentioned above, but the problem exists in that a user should input in sequence every channel number when the user selects desired channel, because the set-top box or the TV is controlled by an external remote controller.

That is, in recent, a broadcasting provider has provided not only live programs but also on-demand programs requested by the user, and has provided various services such as also a game, a shopping, an SNS, a chatting service, a search and a cloud service, etc.

A program guide has been provided for supporting various services.

The program guide is mainly used to provide live program information to the user at the beginning, but has provided functions of allowing the user to access to various services as well as guide of programs in recent.

A conventional program guide is provided by using mainly the JAVA platform, and operates by JAVA virtual machine.

However, technique for providing the program guide in hypertext markup language HTML page has been studied, so that the program guide can be executed on a browser set at a set-top box, etc. to guarantee compatibility, in recent.

However, since recent program guide stores considerable amount of information, tree depth of a menu in the program guide is very deep and the same screen or the same data processing method may not be performed.

It is difficult to realize and manage enormous amount of the program guide with one HTML page.

Since the program guide including various information may not be provided by one HTML page, HTML pages for navigation of menus has been required. However, techniques for managing the HTML pages have not been provided.

SUMMARY

For solving the above problems, the present invention provides a method and an apparatus for managing effectively HTML pages for navigation of menus and a recorded medium therefor.

An embodiment of the invention provides a method of providing a program guide service based on HTML in a broadcasting terminal, the method comprising: outputting a start page according to start request of the program guide service by a user, a container in a resource for the start page generating a first key handler for processing a key event of the user; and outputting at least one menu page for navigation of a menu according to request of the user. Here, each of the start page and the menu page has different resource address, and life cycle of the menu page is managed by the first key handler.

A resource of the menu page includes a context for generating a second key handler and processing the key event delivered from the first key handler by using the generated second key handler.

The container processes directly the key event by using the first key handler or delivers the key event to a context of corresponding menu page.

The start page is disposed at lowest layer of a display, the menu pages are displayed in sequence according to an output order, and the context, to which the key event is delivered from the container, is a context disposed at upper-most layer in the display.

The container stores menu pages being executed at present in a stack, activates one or more of the menu pages stored in the stack according to the key event and outputs the activated menu page.

The menu page is outputted by using an iframe included in the start page.

The context includes layers of which location and attribute are separated.

Another embodiment of the invention provides a recorded medium readable by a processing device tangibly embodying a program executed by the processing device to perform the method.

Still another embodiment of the invention provides an apparatus for providing a program guide service based on HTML, the apparatus comprising: a microprocessor configured to execute a container in an HTML start page resource and a context in at least one menu page resource for navigation of a menu according to request of a user, wherein the container generates a first key handler for processing a key event by the user and the first key handler manages lift cycle of the menu page.

Still another embodiment of the invention provides a method of providing a program guide service based on HTML in a headend connected to a broadcasting terminal through a network, the method comprising: receiving request of an HTML page according to start request of the program guide service from the broadcasting terminal; and transmitting the requested HTML page to the broadcasting terminal. Here, the HTML page includes a start page and at least one menu page having different resource address, a container in a resource for the start page in the broadcasting terminal generates a first key handler for processing a key event by a user, and the first key handler manages life cycle of the menu page.

The method and the apparatus of the present invention use a container and a context, to manage effectively HTML pages for a broadcasting service.

Additional aspects and advantages of the present invention will be set forth in part in the description which follows, and in part will be obvious from the description, or may be learned by practice of the invention.

DETAILED DESCRIPTION

Figure 1:
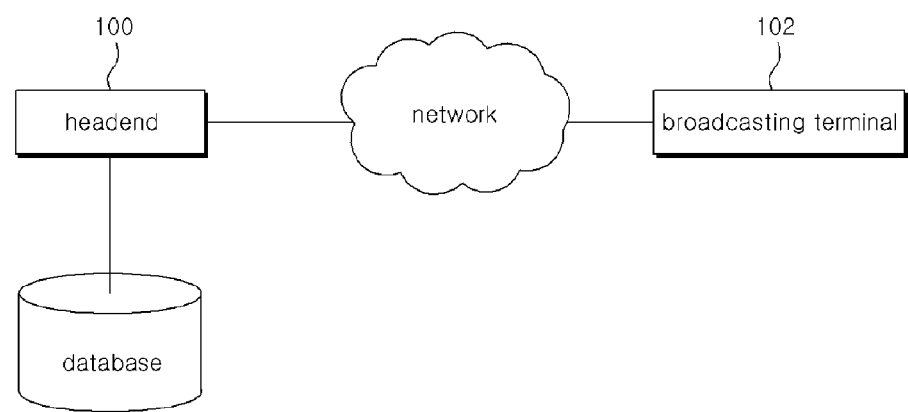
FIG. 1 is a view illustrating a system for providing a broadcasting service according to one embodiment of the present invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

Hereinafter, the preferred embodiment of the present invention will be described in detail with reference to the accompanying drawings. In the following drawings, like reference numerals identify similar or identical elements The present invention relates to a method and an apparatus for providing a program guide service where a broadcasting provider provides an HTML page to a broadcasting terminal and a browser installed to the broadcasting terminal in a program guide mode processes the HTML page.

FIG. 1 is a view illustrating a system for providing a broadcasting service according to one embodiment of the present invention.

In FIG. 1, the system for providing the broadcasting service of the present embodiment may include a headend 100 and a broadcasting terminal 102 connected to the headend 100 through a network.

Here, the network may include an wire/wireless Internet, a satellite network and a broadcasting network.

The headend 100 provides live programs or on-demand programs to the broadcasting terminal 102 according to preset schedule.

The headend 100 converts an audio and video (AV) signal for various broadcasting channels into a broadcasting signal having predetermined format, and transmits the converted broadcasting signal to the broadcasting terminal 102.

The headend 100 receives on-demand programs, game contents, etc. from contents providers, and stores the received on-demand programs and the received game contents, etc. in a database 104.

The headend 100 does not store information related to services in the database 104, and may receive the information related to the services by interworking with a server managed by the contents providers.

The broadcasting terminal 102 receives the broadcasting signal from the headend 100, decodes the received broadcasting signal and outputs the decoded broadcasting signal.

In one embodiment, the broadcasting terminal 102 may be a TV or a set-top box. However, the broadcasting terminal 102 is not limited as the TV or the set-top box, and may include every device, which can receive the broadcasting signal and provide a program guide service based on HTML described below, such as a smart phone, a table PC, a desktop, etc.

Hereinafter, the broadcasting terminal 102 will be assumed as the set-top box connected to the TV (display).

Figure 2:
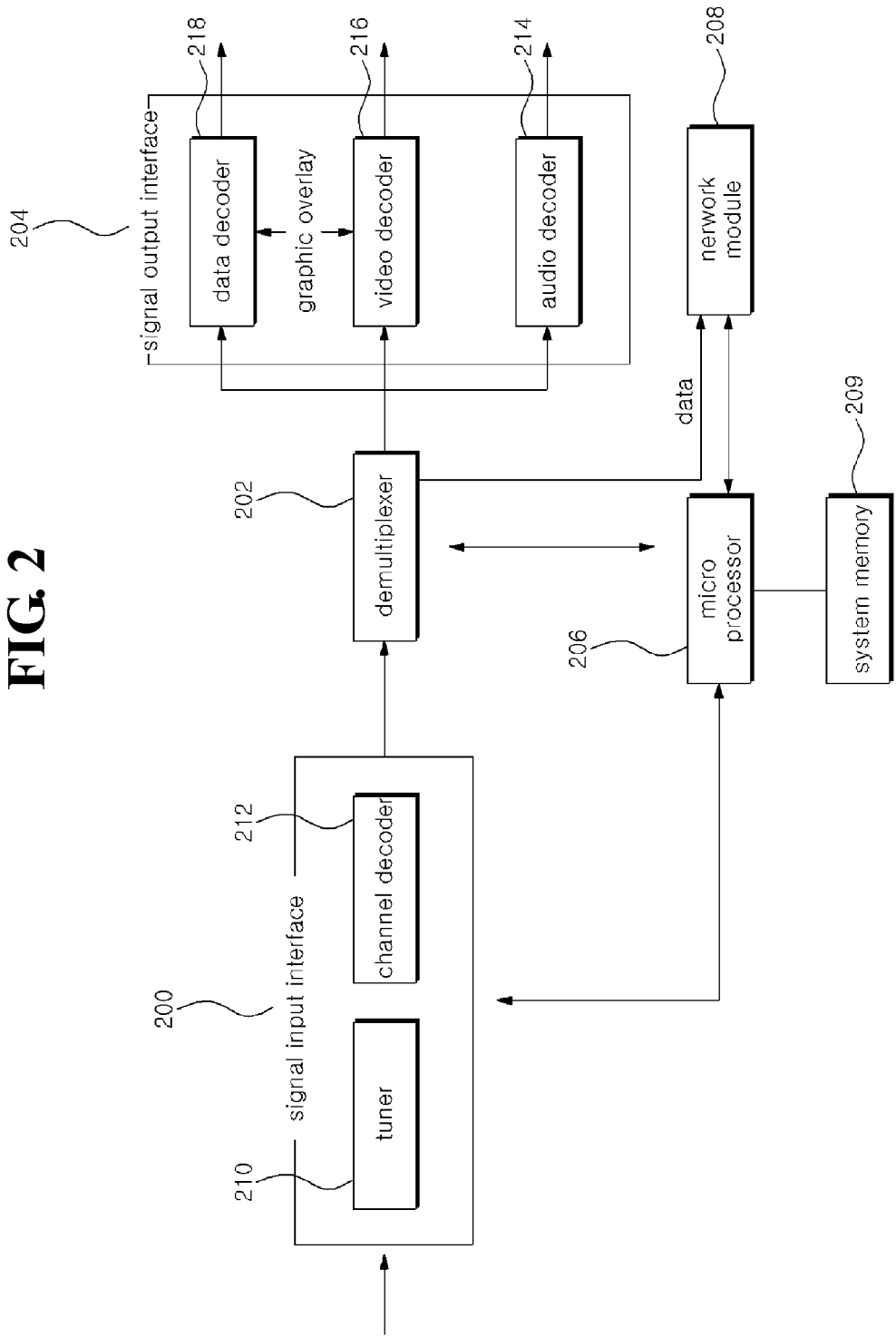
FIG. 2 is a view illustrating a broadcasting terminal according to one embodiment of the present invention.

FIG. 2 is a view illustrating a broadcasting terminal according to one embodiment of the present invention.

In FIG. 2, the broadcasting terminal 102 of the present embodiment may include a signal input interface 200, a demultiplexer 202, a signal output interface 204, a microprocessor 206, a network module 208 and a system memory 209.

The signal input interface 200 includes a tuner 210 for receiving a compressed broadcasting signal and a channel decoder 212 for selecting a channel desired by the user from the received broadcasting signal under control of the microprocessor 206. The broadcasting signal compressed according to proper compression standard may be any one or combination of a video signal, an audio signal and a data signal and may be demultiplexed by the demultiplexer 202, and then the demultiplexed broadcasting signal may be transmitted to the signal output interface 204.

The signal output interface 204 includes decoders corresponding to each of the video signal, the audio signal and the data signal, i.e. an audio decoder 214, a video decoder 216 and a data decoder 218. For example, the demultiplexer 202 extracts the audio signal from the broadcasting signal of the desired channel and transmits the extracted audio signal to the audio decoder 214 of the signal output interface 204. The audio decoder 214 decodes the transmitted audio signal and transmits the decoded audio signal to a speaker of the user in an analog type.

The video signal is decoded by the video decoder 216 of the signal output interface 204 and then the decoded video signal is provided to a display device. e.g. TV. In the event that the broadcasting signal corresponds to the combination of the video signal and the data signal, the data signal is extracted by the demulitplexer 202, and the extracted data signal is transmitted to the data decoder 218. The data decoder 218 decodes the data signal for compressed data broadcasting, and the decoded data signal is transmitted to a display device with matched with the video signal by a graphic overlay. Furthermore, the data signal decoded by the data decoder 218 may be stored in the system memory 209.

In one embodiment, the broadcasting signal may include not only AV data for a program requested by the user but also data (hereinafter, referred to as "program guide data") for providing of the program guide service to the user.

The program guide data may include a channel list and channel information, time information, description information and poster information of live programs and on-demand programs, and include also information for a game, a shopping, an SNS, a chatting service, a search service and a cloud service. Moreover, the program guide data may include further a start page resource having unique address information and menu page resources as described below. The program guide data is stored in the system memory 209.

Here, the unique address information may be a uniform resource identifier URI or a uniform resource location URL.

The present invention provides a method using pages (start page and menu pages) having unique URI or URL in a program guide mode, wherein the pages may be shown with one screen to the user.

As described above, the start page resource and the menu page resources are data based on HTML having unique address information. The start page resource includes a container for managing menu pages, and the menu page resource includes a context interworking with the container.

Figure 3:
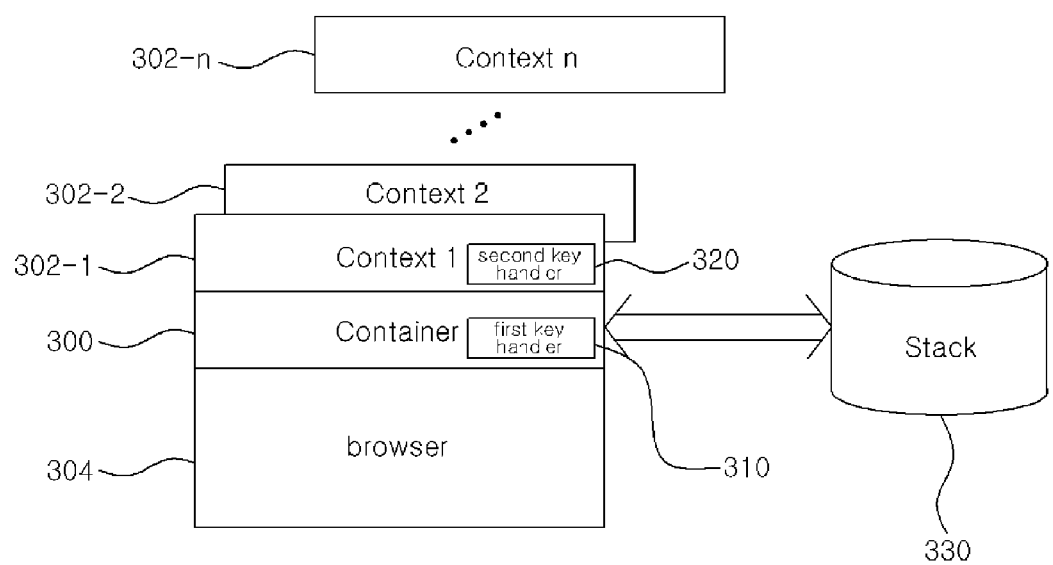
FIG. 3 is a view illustrating a framework for a program guide service according to one embodiment of the present invention.

Here, the container and the context are defined as application programs made with JAVA script language under the JAVA platform to perform certain functions in an HTML page, and are programs executed by a browser installed at the broadcasting terminal 102. FIG. 3 is a view illustrating a framework for a program guide service according to one embodiment of the present invention.

In FIG. 3, the framework may include a container 300 loaded by a browser 304 and contexts 302-1 to 302-n loaded by the container 300.

The microprocessor 206 of the broadcasting terminal 102 loads the browser, the container and the context to the system memory 209 and executes the loaded browser, the loaded container and the loaded context.

As mentioned above, the container 300 is included in the start page resource (index.html), and each of the contexts 302-1 to 302-n may be included in the menu page resources for navigation of the menus, respectively.

The start page resource and the menu page resource may be received from the headend 100 through the network module 208 of the broadcasting terminal 102. Additionally, the headend 100 may transmits periodically the start page resource and the menu page resource to the broadcasting terminal 102.

In one embodiment, the container 300 in the start page resource generates a first key handler 310 at a executing time, i.e. initiation time and manages life cycle of the menu pages by using the generated first key handler 310.

In one embodiment, the container 300 may perform an openContext function (open of the menu page), a closeContext function (close of the menu page), a pushContext function (push of the menu page), a popContext function (displaying the menu page in a pop-up type) and a clearContext function (total menu page closing).

Here, the first key handler 310 includes a key value inputted through a remote controller by the user and functions mapped with the key value.

Figure 4:
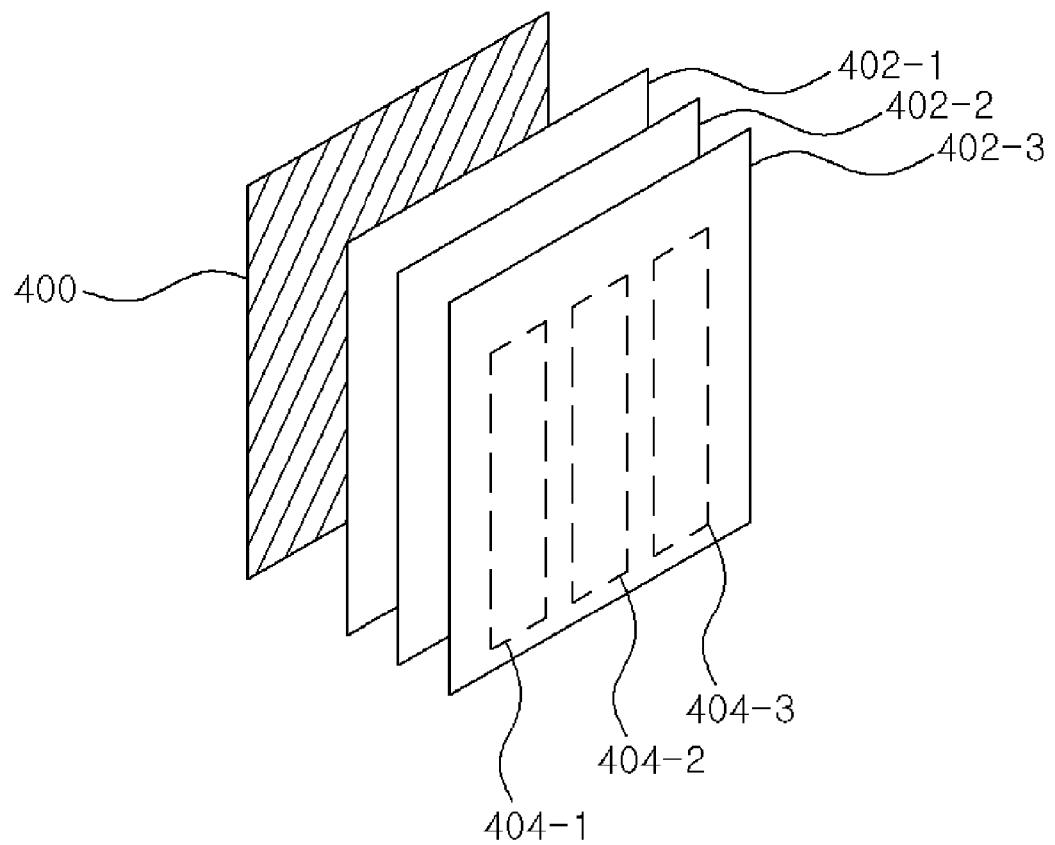
FIG. 4 is a view illustrating arrangement of a start page and menu pages outputted sequentially on a display according to one embodiment of the present invention.

FIG. 4 is a view illustrating arrangement of a start page and menu pages outputted sequentially on a display according to one embodiment of the present invention.

In one embodiment, the start page 400 may be disposed at a lowest layer of the display, and the latest menu page 402-3 may be disposed at an upper layer of the display.

Preferably, when the menu pages are sequentially outputted, a first menu page 402-1 may be outputted in hidden state according as the third menu page 402-3 is outputted in the event that the first menu page 402-1 to the third menu page 402-3 are sequentially outputted. That is, in the event that the menu pages are sequentially outputted, the menu pages may be outputted so that the user can view only the latest menu page.

In one embodiment, the menu pages 302 may be outputted through an iframe included in the start page resource.

The iframe, as a tag for inserting a frame in the HTML page, reads other HTML page in one page and shows the read other HTML page.

In one embodiment, in the event that the user requests the navigation of the menu, the iframe corresponding to size of the display is generated and a menu page having address information corresponding to request of the user is displayed.

Preferably, the start page may perform playing of a program selected by the user, and the menu page 402-3 disposed at the uppermost layer may be outputted with transparent state and the other menu pages 402-1 and 402-2 may be outputted with hidden state so that the user can see the program to being played.

That is, the menu page disposed at the uppermost layer overlays on the start page.

FIG. 4 shows arrangement of menu pages in the start page, but it may be understood that FIG. 4 illustrates the framework including the container 300 and the context 302 managed by the container 300.

As shown in FIG. 3 to FIG. 4, the container 300 of the present embodiment stores the menu pages 402 outputted in sequence in a stack 330 when the user inputs a key event for the navigation of the menu.

Here, the latest menu page of the menu pages outputted in sequence may have lowest depth.

Figure 5:
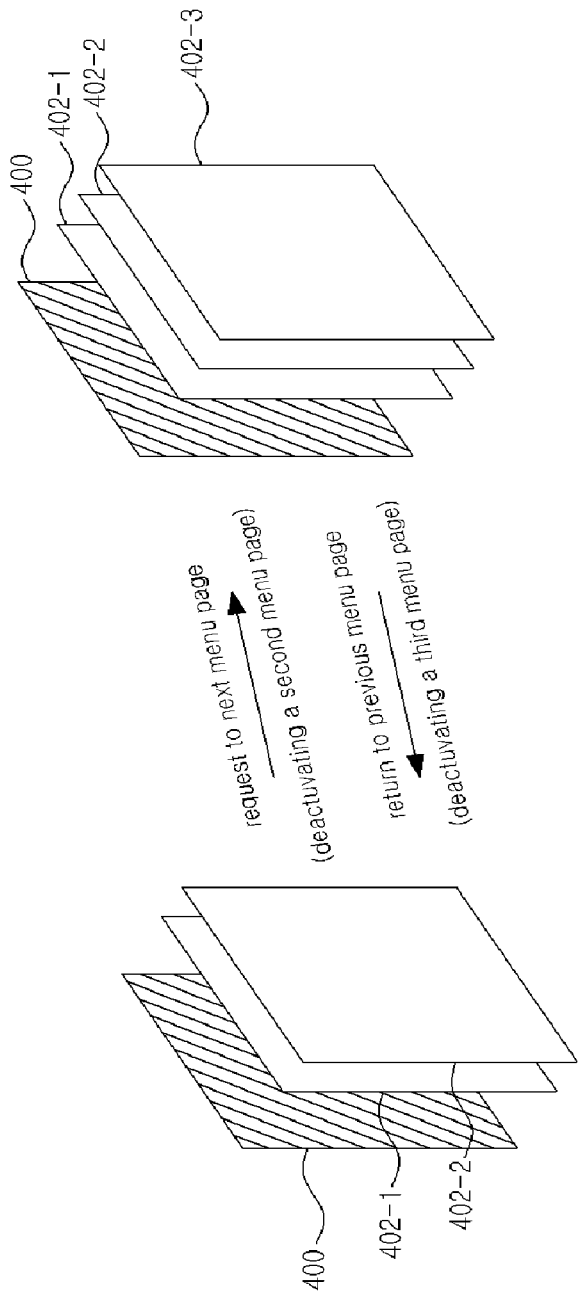
FIG. 5 is a view illustrating a process of managing life cycle of a menu page in a container according to one embodiment of the present invention.

In FIG. 5, in the event that next menu page 402-3 is outputted according as the user requests the navigation of the menu, the container 300 converts previous menu page 402-2 into deactivating state and stores the converted previous menu page 402-2 in the stack 330. In the event that the user requests return to the previous menu page 402-2, the container 300 reads the previous menu page 402-2 from the stack 330 and converts the read previous menu page 402-2 into activating state. In this time, the menu page 402-3 shown at the uppermost layer in present time is converted into deactivating state and then is stored in the stack 330.

To convert the menu page to activating state or deactivating state is performed by the first key handler 310 of the container 300.

On the other hand, in the event that the key event is inputted, the first key handler 310 determines whether it processes directly the inputted key event or delivers the inputted key event to a context of other menu page.

In the event that the key event corresponds to request to next menu page or request of return to previous menu page, the first key handler 310 handles directly the key event.

Figure 6:
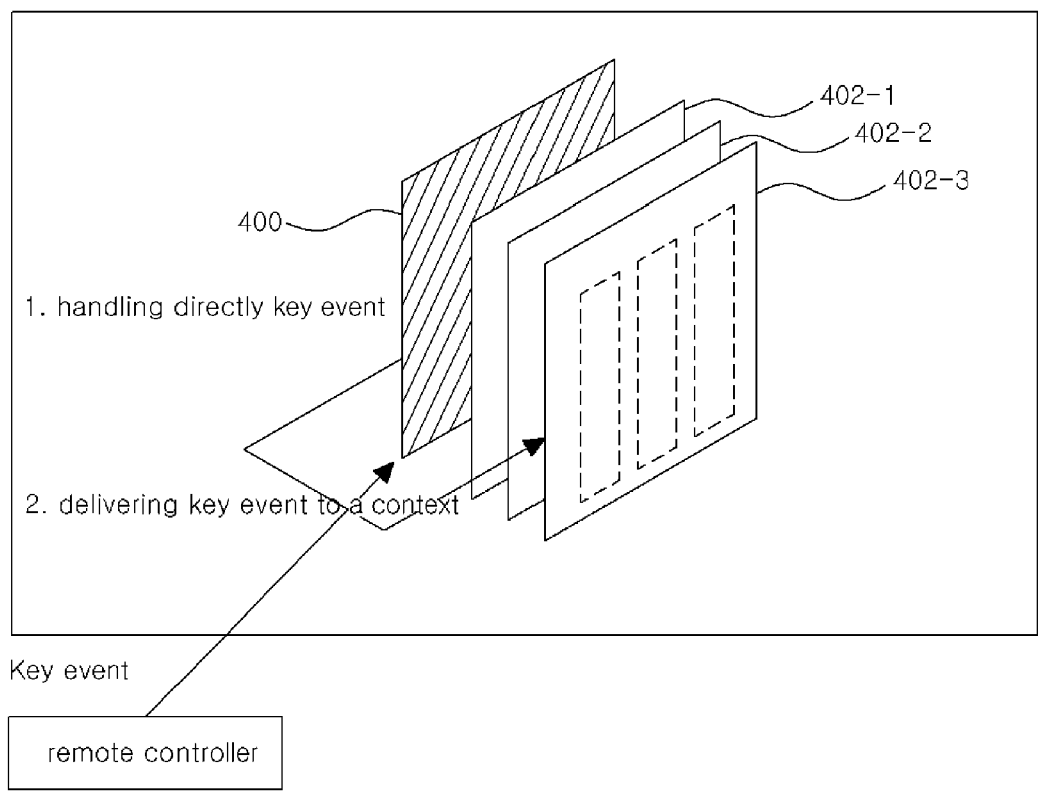
FIG. 6 is a view illustrating a process of processing a key event in the container according to one embodiment of the present invention.

Additionally, in the event that key event corresponding to closing of every menu page 402-1 to 402-3 is inputted as shown in FIG. 6, the first key handler 310 handles directly the key event.

In the event that key event should be processed at other menu page, the container 300 delivers the inputted key event to a context for corresponding menu page 402-3 as shown in FIG. 6.

For example, in the event that the menu page disposed at uppermost layer of the display at present corresponds to a menu page (VOD purchase page) for purchasing specific on-demand program and the user inputs a key event for request of purchase, the first key handler 310 delivers the key event to a context in the VOD purchase page, and the context processes purchasing request of a VOD by the user according to the delivered key event.

As mentioned above, the context, to which the key event is delivered from the container 300, may be a context included in the menu page disposed at uppermost layer.

For example, in the event that the third menu page 402-3 is disposed at uppermost layer as shown in FIG. 6, corresponding context 302-3 may be a context to which the key event is delivered from the container 300.

To process the key event, the context of the present embodiment generates the second key handler 320 at an executing time, and processes the key event delivered from the container 300 by using the second key handler 320. More particularly, the second key handler 320 may perform a function (for example, playing, purchasing, ending of specific on-demand program, etc.) corresponding to the key event, and perform an operation such as open and close of the menu page.

On the other hand, the container 300 may perform a play function of a program, which the user wants to view in advance, in the program guide mode.

As shown in FIG. 4, the menu page 402 of the present embodiment may include layers 404 having different location and attribute, and the layers 404 may show different information in the menu page.

For example, in the event that the menu page is a page for a program live guide, a first layer 404-1, a second layer 404-2 and a third layer 404-3 may be defined as a channel information display area(channel/time information display area), a program moving picture display area of a channel required by the user and a program related information display area, respectively.

Figure 7:
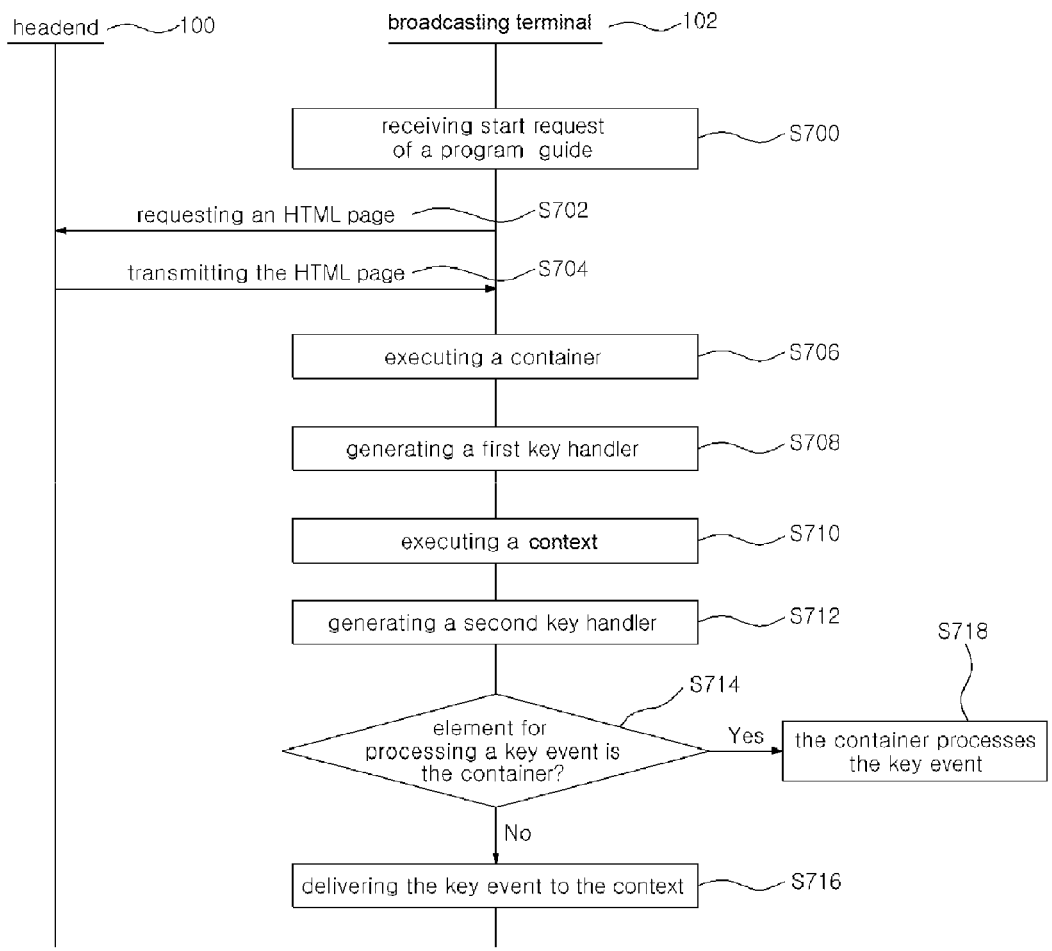
FIG. 7 is a flowchart illustrating a process of providing a program guide service based on HTML according to one embodiment of the present invention.

FIG. 7 is a flowchart illustrating a process of providing a program guide according to one embodiment of the present invention.

In FIG. 7, it is assumed that a start page resource and a menu page resource for the program guide are provided from the headend 100 according to request of the broadcasting terminal 102.

Referring to FIG. 7, the broadcasting terminal 102 receives start request of the program guide from the user in a step of S700.

The broadcasting terminal 102 requests an HTML page for a program guide mode to the headend 100 according to the start request in a step of S702, and the headend 100 transmits the HTML page to the broadcasting terminal 102 in a step of S704. In the step of S704, the HTML page may include the start page resource and the menu page resources having lower layer compared with a start page.

In a step of S706, the broadcasting terminal 102 executes the container 300 included in the start page resource.

The broadcasting terminal 102 outputs the start page to a display according as the container 300 is executed.

The container 300 generates the first key handler 310 for processing a key event by the user in a step of S708, and the container 300 manages state of the menu pages for navigation of the menu by using the first key handler 310.

As described above, managing of the menu page may include a process of changing the menu page to activate or deactivate by interworking with the stack 330, a process of ending total menu pages, etc.

In the event that the key event is an event related to executing of the menu page, the container 300 executes the context 302 in a menu page being executed at present in a step of S710.

In a step of S712, the context 302 generates the second key handler 320 for processing the key event at executing initial time.

In a step of S714, the container 300 determines an element for processing every key event inputted through a remote controller in the program guide mode.

In the step of S714, in the event that the inputted key event is a key event processed by a context being executed at present, the key event is delivered to corresponding context in a step of S716, and the second key handler 310 in the context to which the key event is delivered performs an operation corresponding to the key event.

In the event that the element for processing the key event is the container 300 in the step S714, the container 300 processes directly the key event in a step of S718.

The method of providing a channel service according to an embodiment of the invention, can be implemented in the form of program instructions that can be executed by various means for processing electronic information, and can be recorded on a storage medium. The storage medium can include program instructions, data files, data structures, etc., alone or in combination.

The program instructions recorded on the medium can be designed and configured specifically for the present invention or can be a type of medium known to and used by the skilled person in the field of computer software. Examples of a storage medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a means for electronically processing information through the use of an interpreter, etc.

The hardware mentioned above can be made to operate as one or more software modules that perform the actions of the embodiments of the invention, and vice versa.

The embodiments of the invention described above are disclosed for illustrative purposes. Those of ordinary skill in the art to which the present invention pertains would understand that various modifications, alterations, and additions can be made without departing from the spirit and scope of the invention, and that such modifications, alterations, and additions are encompassed by the scope of claims defined below.

The invention claimed is:

1. A method of providing a program guide service based on HTML in a broadcasting terminal, the method comprising:
   receiving a start request of the program guide service from a user;
   outputting, by a microprocessor of the broadcasting terminal, a start page according to the received start request by executing a container in an HTML start page resource to generate a first key handler for processing a key event inputted by the user;
   receiving a menu request to navigate a menu of the program guide service from the user; and
   outputting, by the microprocessor, at least one menu page for navigation of the menu according to the received menu request by executing a context in at least one menu page resource, wherein each of the start page and the at least one menu page has a different resource address, a life cycle of the at least one menu page is managed by the first key handler, the executing of the context generates a second key handler for processing the key event delivered from the first key handler, and when the key event is inputted by the user, the container determines an element for processing the inputted key event, and processes directly the inputted key event using the first key handler or delivers the inputted key event to a context of a corresponding menu page based on the determined element for processing the inputted key event.

2. The method of claim 1, wherein the start page is disposed at lowest layer of a display, the menu pages are displayed in sequence according to an output order, and the context, to which the key event is delivered from the container, is a context disposed at uppermost layer in the display.

3. The method of claim 1, wherein the container stores menu pages being executed at present in a stack, activates one or more of the menu pages stored in the stack according to the key event and outputs the activated menu page.

4. The method of claim 1, wherein the menu page is outputted by using an iframe included in the start page.

5. The method of claim 1, wherein the context includes layers of which location and attribute are separated.

6. A non-transitory computer-readable medium tangibly embodying a program executable by a processing device of a broadcasting terminal to perform steps comprising;

receiving a start request of the program guide service from a user;

outputting a star page according to the received start request by executing a container in an HTML start page resource to generate a first key handler for processing a key event inputted by the user;

receiving a menu request to navigate a menu of the program guide service from the user; and outputting at least one menu page for navigation of the menu according to the received menu request by executing a context in at least one menu page resource, wherein each of the start page and the at least one menu page has different resource address, a life cycle of the at least one menu page is managed by the first key handler, the executing of the context generates a second key handler for processing the key event delivered from the first key handler, and when the key event is inputted by the user, the container determines an element for processing the inputted key event, and processes directly the inputted key event using the first key handler or delivers the inputted key event to a context of a corresponding menu page based on the determined element for processing the inputted key event.

7. An apparatus for providing a program guide service based on HTML, the apparatus comprising:

a microprocessor configured to output a start page according to a start request of the program guide service received from a user by executing a container in an HTML start page resource and to output at least one menu page for navigation of a menu of the program guide service according to a menu request to navigate the menu from the user by executing a context in at least one menu page resource for navigation of a menu according to request of a user, wherein the container generates a first key handler for processing a key event inputted by the user, the first key handler manages life cycle of the at least one menu page, the executing of the context generates a second key handler for processing the key event delivered from the first key handler, and when the key event is inputted by the user, the container determines an element for processing the inputted key event, and processes directly the inputted key event using the first key handler or delivers the inputted key event to a context of a corresponding menu page based on the determined element for processing the inputted key event.

8. A method of providing a program guide service based on HTML in a headend connected to a broadcasting terminal through a network, the method comprising:

receiving request of an HTML page according to a start request of the program guide service from the broadcasting terminal; and transmitting the requested HTML page to the broadcasting terminal, wherein the HTML page includes a start page and at least one menu page for navigation of a menu each having different resource addresses, a container in a resource for the start page in the broadcasting terminal generates a first key handler for processing a key event inputted by a user, the first key handler manages a life cycle of the at least one menu page, the broadcasting terminal outputs the at least one menu page according to a menu request from the user by executing a context in at least one menu page resource, executing of the context generates a second key handler for processing the key event delivered from the first key handler, and when the key event is inputted by the user, the container determines an element for processing the inputted key event, and processes directly the inputted key event using the first key handler or delivers the inputted key event to a context of a corresponding menu page based on the determined element for processing the inputted key event.

* * * * *